BEST AVAILABLE COPY
S. B. SEXTON.
Stove.
No. 1,622. Reissued Feb. 16, 1864.
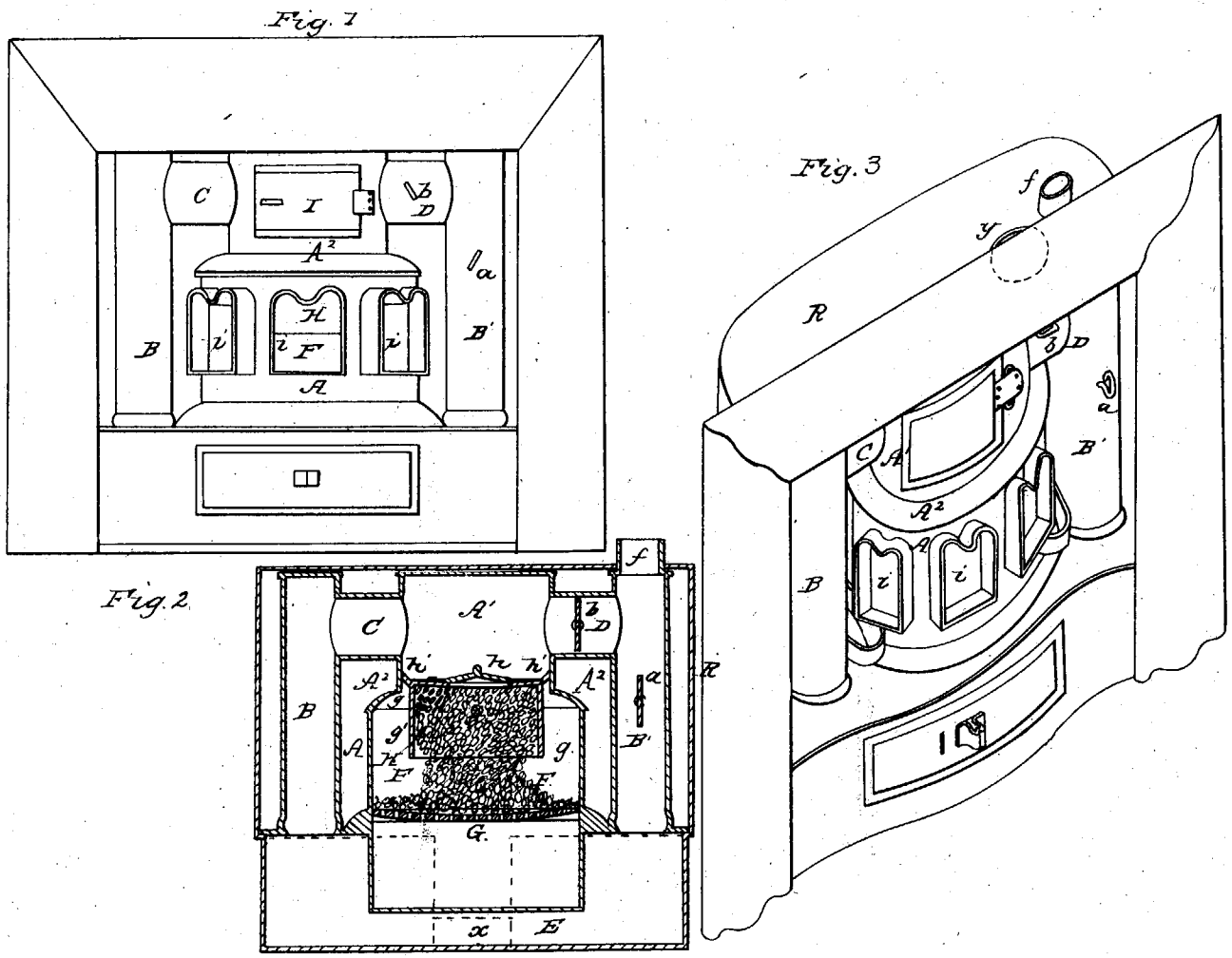
WITNESSES:
A. M. Linnell
E. Stetson
INVENTOR
S. B. Sexton
by his atty
Mason Fenwick & Lawrence
N. PETERS. Photo-Lithographer, Washington, D. C.

UNITED STATES PATENT OFFICE.

SAMUEL B. SEXTON, OF BALTIMORE, MARYLAND.

IMPROVEMENT IN STOVES.

Specification forming part of Letters Patent No. 23,716, dated April 19, 1859; Reissue No. 1,242 dated December 3, 1861; Reissue No. 1,622, dated February 16, 1864.

DIVISION No. 2.

*To all whom it may concern:*

Be it known that I, S. B. SEXTON, of the city of Baltimore and State of Maryland, have invented a new and useful Improvement in Fire-Place Stoves; and I do hereby declare that the following is a full, clear, and exact description of the same, reference being had to the accompanying drawings, forming part of this specification, in which—

Figure 1 is a front elevation of a stove illustrating my invention. Fig. 2 is a vertical longitudinal section of the same. Fig. 3 is a perspective view of the stove, exhibiting more plainly the location of the cold-air chamber, hereinafter described.

Similar letters of reference in the several figures indicate corresponding parts.

Before stating and describing my invention, I deem it proper to remark that previously to the development thereof fire-place stoves failed to produce or radiate from a given quantity of fuel a sufficient amount of heat into the room in which they were situated. This lack of heat was due to the form of the stove to a certain extent, but more particularly to an imperfect combustion of the fuel and a very imperfect reverberatory action within the combustion-chamber of the stove of the expanded and heated gases as they were evolved or emitted from the incandescent coal. Such stoves also failed to answer perfectly the purpose of simultaneously heating the room in which they were situated and a series of apartments above or contiguous thereto, for the reason that the cold air admitted from the outside of the building into the chamber which partly encircled the combustion-chamber and diving-flues came in contact with surfaces which were but imperfectly heated by the gases emitted in but a partially-ignited state from the coal in the combustion-chamber.

To remedy the first and main difficulty, I have contrived and experimented with numerous plans, and at last, as practical experience proves, succeeded in what I aimed to accomplish, and in the accomplishment of this the second difficulty was no longer experienced.

To enable others skilled in the art to make and use my invention, I will proceed to describe the same, with reference to the drawings.

In the first place, I have remodeled the form of the stove A A′ by making the part A′ of much smaller diameter than the part A, and uniting the two parts by a curved, beveled, or horizontal ring-plate, $A^2$, which overhangs a portion of the combustion-chamber A. Whatever may be the shape of the plate $A^2$, it should be nearly at right angles to the walls of the parts A and A′. This form of stove A A′ gives a large combustion-chamber, and still affords room above the same for horizontal branches of diving-flues without setting such diving-flues too far apart to admit of the application of the stove to a narrow fire-place. I also have provided a door, I, in the part $A^2$ of the stove, for the introduction of fuel into the part A.

The next and most important change that I have made is the division of the stove into two apartments by the introduction into the stove of a fuel-supply magazine, H, of such form and in such manner that its lower end is open at bottom and free from the horizontal grate G, while its upper end is closed except at its center, where a fuel hole, *j*, is formed. This hole is closed by a removable cover, *h*, after the fuel is supplied. The fuel-supply magazine is in diameter at its upper end somewhat smaller than the interior diameter of the part A′ of the stove, and extends down from near the plate $A^2$ to about the center of the vertical depth of the part A of the stove. The amount of downward extension and the location of the magazine may be varied to some extent, but it is essential to have a small space, *g*, between the upper portion of the fuel-supply magazine and the part A′ of the stove, and a large space, *g′*, between the part A and the lower portion of the fuel-supply magazine. The supports of the magazine may be free from the grate G or so located that the gases emitted from the incandescent coal shall have a clear and unobstructed space, F, to circulate in—that is to say, such space extending over the whole area of the grate or base surface of the part A of the stove.

In the drawings I have shown the supports

*h′ h′* formed on the upper end of the fuel supply magazine and connected to the part A′ of the stove; but I do not limit myself to this location of the supports, as they may be on any part of the interior of the stove A A′, or any part of the fuel-supply magazine, so long as they allow the burning mass of coal to spread out laterally from the lower end of the magazine and burn in thin layers in a clear unobstructed combustion-space outside of the range of the said magazine—that is to say, when the combustion of the fuel is allowed to take place within the part A of the stove, and not in a grated fire-pot resting on the grate G or any upward extension thereof.

In order to have the kindling-doors or kindling and illumination windows as much as possible in relief from the flame, I have formed extension or projecting frames *i i* on the outside of the part A of the stove and on the front edge of each of these frames I apply a removable sash with transparent material set in it. The illumination-doors are opposite the free space F, between the fire-grate and the magazine, and therefore the material to kindle the fire can be placed through them on the grate and directly under the fuel supply magazine. If a grated fire-pot was used this could not be done.

To afford facilities for kindling the fire in base-burning stoves is of much importance. It is also important to have the mica in relief from the flame to prevent too rapid tarnishing thereof from direct contact of flame. The lower portion of the interior of the part A of the stove, from the grate G to a suitable height, is to be, as usual, lined with some material which is not speedily burned out. Soapstone, fire-brick, or heavy iron may be used. The inner upper corner should be beveled off so as to present an inclined ring-bed around the edge of the grate. The stove thus constructed I combine with diving-flues B B′ in the manner represented or in any of the known ways of using diving-flues with fire-place stoves which have not my invention applied to them. In the drawings the diving-flues are shown as connected with the part A′ of the stove by means of branch flues C D, and also as connected with a hollow base, E. The branch flue D has a damper, *b*, and the diving-flue B′ is provided with a damper, *a*. The diving-flue B′ is in this instance connected with the exit or draft flue *f*. The location and number of the diving-flues and dampers may be changed as circumstances demand; but in all cases the products of combustion when "spent" must pass into the chimney-flue and not back through the grate into the fire. The draft must also be up through the ash-pit and grate. It matters not how the gases are taken from the part A of the stove so long as the fuel-magazine H and the diving-flues are employed in combination with a fire-place stove adapted for radiating a sufficient amount of heat on the principle I have set forth.

The stove thus far constructed answers as a fire-place stove for heating the room in which it is situated; and to avail myself of the superior advantages of this stove for heating apartments above or contiguous to the room in which it is situated, I inclose the back part of the whole stove, as well as the sides and top, to as great an extent as practicable, with a hollow jacket, R, which is snugly fitted to the stove. This jacket communicates with a flue leading through the back of the chimney from the external atmosphere, as indicated by the red lines at *x*. It may also have passages leading from the room into it, and it likewise communicates with one or more hot-air pipes leading to apartments by means of an aperture or apertures, one of which is represented at *y*. The air in this chamber is heated by radiated heat from the stove A A′ and flues B B′.

The great advantage that I obtain from the use of a fuel-supply magazine with its lower end free, above the grate, in combination with the enlarged base of the part A of the stove, is this: In the first place, the fuel can spread in comparatively thin layers, with respect to the superincumbent supply-coal, over that portion of the base outside of the range of the magazine, and thus burn on a surface much larger in diameter than the diameter of the fuel-magazine, and still the superincumbent body or mass of supply-coal is confined in the magazine. Thus, the heat thrown off from the incandescent coal will be more powerful, because the gases are fully expanded and ignited, and the heat thereof comes directly in contact with the part A of the stove, it not being obstructed and kept isolated from this part of the stove by a grated fire pot. Again, as the gases cannot, when the cover *h* is closed, rise up through the fuel-supply magazine they are compelled to descend and pass under its lower end. Thus they pass between the thin layers of highly-ignited coal on the grate and the deep body of but partially-ignited coal in the magazine, and therefore cannot reach the passage *g* in any other but a perfectly expanded and heated state; or, in a word, if the air is supplied to an adequate extent at the base surface they pass from the incandescent coal in the form of red flame. Again, the gases in this highly-ignited and expanded state strike the interior surface of the part A of the stove, rise to the plate $A^2$, and at this point the exit being small they are consequently reverberated and caused to remain temporarily under pressure between the fuel-supply magazine and the part A of the stove. A gradual escape is, of course, taking place through the small annular passage *g*. It is by thus acting upon the gases that the most perfect combustion and the greatest possible amount of heat from a given quantity of coal are secured. The escaping gases pass from the space *g* into the part A′ of the stove, and from thence into the diving-flue B, and from this flue into the hollow base, and thence up the return-flue B′ and into the chimney or draft flue *f*. The effect of the thus perfectly expanded and ignited gases upon the stove A A′ and flues B B′ is to give an increased radiation therefrom of heat both into the room and upon the cold-air chamber R, and thus the apartment wherein the stove is situated is more perfectly heated; so also are the apartments above or contiguous thereto. It should be stated that the grate G is supplied continuously from the fuel-magazine with an additional quantity of coal as rapidly as the consumption takes place. The magazine being large enough to contain fuel sufficient to last twelve or twenty-four hours, by replenishing the magazine with coal the fire may be kept up for an indefinite period. It is desirable, where saving of fuel is an item, to have the fuel-supply-magazine cover fit snug in its seat, so as to prevent the entrance of air at the top of the magazine when the damper *b* is closed, and the stove burns on the "base-burning" principle. It also should be stated that when the fire is to be kindled in the stove the damper *b*, the door I, and the draft-door *k* in the ash-pan, are opened, the cover *h* removed, and a plentiful supply of kindling placed on the grate G, through the frames of the illumination doors or windows. The kindling being ignited, a moderate supply of coal is introduced through the door I and opening *j* into the magazine. The door I is now again closed. The draft being directly upward through the fuel-supply magazine the coal is in a short time thoroughly ignited. The fuel-magazine is now completely filled with coal, the cover *h* fitted snug in its seat, and the door I again shut. When this mass of supply-coal is sufficiently ignited at its base, and heated throughout, the damper *b* is shut.

I have found that when the stove is well started it will burn slowly with both dampers and the draft-door closed, or nearly closed, and it is advisable to thus adjust the regulators on going to bed, as the fuel will then consume but slowly during the night. The damper *b* may always be closed after the fire is at full blast, and the damper *a* be used as the regulator.

The coal in the part A of the stove being perfectly incandescent when the fire is at full blast, the greatest possible amount of heat and light are evolved and emitted, and, as the front of the stove is provided with illumination doors or windows directly opposite the incandescent mass of coal, a brilliant and cheerful appearance is presented to view.

Although the fuel-supply-magazine cover might be kept off while the fire is in full blast and the door I closed, I do not think it economical or advisable to do so. It is true the fuel-supply magazine will, even when the cover is off, be of great advantage in holding in a concentrated state the newly-inserted coal; also, in causing the part A′ of the stove outside the fuel-magazine to be occupied by a constantly incandescent mass; but while this is the case the draft will be both up through and outside of the fuel-supply magazine, and the consumption of the fuel consequently will be very rapid without a proportionate benefit.

Having described my invention, I will here state that I do not limit myself to the one specified mode of connecting the diving-flues with the part A of the stove. Further, that I do not restrict myself to any specific number of dampers and chambers or flues—nor to the particular location of the cold-air chamber. Neither do I limit myself to the exact arrangement of the various parts, so long as the effect and principle of operation be not essentially departed from; but I do confine myself to a fuel-magazine which has a free unobstructed space below it out to the wall or lining of the stove, or in effect substantially such a space.

What I claim as my invention, and desire te secure by Letters Patent, is—

1. The adaptation of a fire-place stove which has diving-flues for use with a fuel-supply magazine which has an unobstructed space between its lower end and the grate, substantially as and for the purpose set forth.

2. A fire-place stove which has diving-flues, constructed with the reduced portion A′, enlarged portion A, reverberating plate $A^2$, gas-space *g*, projecting window or door frames *i*, and fuel-supply magazine H, substantially as and for the purpose set forth.

3. A fire-place stove with diving-flues and kindling-apertures *i i*, in combination with a fuel-supply magazine which has a free unobstructed space below and out to the interior surface of the part A, between itself and the grate G, substantially as and for the purpose set forth.

4. In combination with a fire-place stove which has diving-flues, a fuel-supply magazine which has a free unobstructed burning-space below it and out to the wall of the stove, substantially as described.

5. The combination of the fuel-supply magazine, which is arranged to have a space between, its lower end and the grate G, with a fire-place stove which has a contracted part, A′, in which the gases circulate in contact with and over the cover of the fuel-supply magazine, and from which the gases pass into diving-flues, and thence under or around the ash-pan and up to the draft or exit flue, substantially as and for the purpose set forth.

6. The chamber A A′ $A^2$, with door I, in combination with the internally-located fuel-supply magazine H, which is free from the grate and has a removable cover, substantially as and for the purpose set forth.

7. A fire-place stove which combines in its construction a burning base-surface G, of larger diameter than the fuel-magazine, a magazine, H, and diving-flues, substantially as and for the purpose set forth.

8. A cold-air chamber combined in any manner, substantially as described, with a stove having the fuel-supply magazine H, for the purpose set forth.

9. The combination of the main chamber A, fuel-supply magazine H, flues B E B′, and damper *b*, substantially as and for the purpose set forth.

SAMUEL B. SEXTON.

Witnesses:
R. T. CAMPBELL,
E. SCHAFER.